(12) United States Patent
El-Hanany et al.

(10) Patent No.: US 7,339,176 B2
(45) Date of Patent: Mar. 4, 2008

(54) RADIATION DETECTOR HEAD (75) Inventors: Uri El-Hanany, Rehovot (IL); Arie Shahar, Moshav Magshimim (IL); Alex Tsigelman, Petach Tikva (IL)

(73) Assignee: Orbotech Medical Solutions Ltd., Yavne (IL)

( * ) Notice: Subject to any disclaimer, the term of this patent is extended or adjusted under 35 U.S.C. 154(b) by 246 days.

(21) Appl. No.: 11/180,735

(22) Filed: Jul. 14, 2005

(65) Prior Publication Data

US 2006/0011852 A1   Jan. 19, 2006

Related U.S. Application Data (60) Provisional application No. 60/588,191, filed on Jul. 14, 2004.

(51) Int. Cl.
G01T 1/24 (2006.01)

(52) U.S. Cl. ................................. 250/370.09

(58) Field of Classification Search ........... 250/370.08, 250/370.09
See application file for complete search history.

(56) References Cited

U.S. PATENT DOCUMENTS

| 4,490,626 | A | 12/1984 | Carlson |
| 4,525,921 | A | 7/1985 | Carson et al. |
| 4,551,629 | A | 11/1985 | Carson et al. |
| 4,555,623 | A | 11/1985 | Bridgewater et al. |
| 5,436,458 | A | * | 7/1995 | Tran et al. ............. 250/370.09 |
| 6,034,373 | A | | 3/2000 | Shahar et al. |
| 6,760,404 | B2 | * | 7/2004 | Saito et al. ................ 378/98.8 |

OTHER PUBLICATIONS

Article: "Applications of Advanced Z- Technology Focal Plane Architectures" by J.C. Carson, published in SPIE vol. 930, Infrared Detectors and Arrays, pp. 164-182 (1988).
Article: A.E. Bolotnikov et al., entitled "Charge loss between contacts of CdZnTe pixel detectors", published in Nuclear Instruments and Methods in Physics Research A, vol. 432, pp. 326-331 (1999).

* cited by examiner

Primary Examiner—Constantine Hannaher
(74) Attorney, Agent, or Firm—Sughrue Mion, PLLC (57) ABSTRACT A radiation detection camera head having a focal-plane array of pixelated detectors having constant pitch between pixels over the whole of the camera head, while using detector modules having normal production tolerances, and which can nevertheless be readily removed and replaced in the detector array by means of predetermined gaps between adjacent detector modules. The pixels on the side walls of the detector modules have reduced size to maintain constant pitch over the array in spite of production variation between modules. The reduction in sensitivity due to this reduced size is compensated for by the addition of insulated conductive bands on the side walls. The head collimator is such that the septa fall between pixels and between modules, such that head sensitivity is maintained at its optimum value.

27 Claims, 3 Drawing Sheets

RADIATION DETECTOR HEAD

CROSS-REFERENCE TO RELATED APPLICATIONS

This application claims the benefit of U.S. Provisional Patent Application 60/588,191, filed Jul. 14, 2004, which is assigned to the assignee of the present patent application, and whose disclosure is incorporated herein by reference.

FIELD OF THE INVENTION

The present invention relates to the field of radiation detection, and in particular to the field of X-ray and Gamma ray detection and imaging cameras.

BACKGROUND OF THE INVENTION

Solid-state cameras are capable of acquiring high quality images due to their good energy resolution and their high spatial resolution. The energy resolution is mainly dependent on the intrinsic physical properties of the materials from which the detectors of the camera head are made. Such materials are generally various types of semiconductors, such as, CdTe, CdZnTe, Si, GaAs, Ge, InGaAs, and AlGaAs. On the other hand, the spatial resolution of solid-state cameras is mainly dependent on the geometrical design and the dimensions of the pixels that form the focal-plane arrays of the detectors in the camera heads. In the field of X-ray and Gamma ray imaging, the spatial resolution is dictated by the convolution between the resolution of the pixels in the detector focal plane and the resolution of the collimator that is generally placed in front of this focal plane.

In order to produce a high quality image, the detector must be capable of achieving high energy resolution, high spatial resolution, and high sensitivity, which provides good contrast. In addition the spatial transformation from the object plane to the focal plane array should be done accurately. In order to produce this transformation accurately and without image deformation, the pitch between the pixels in the focal-plane of the detectors of the camera head should be maintained constant over the whole of this plane.

A technology known as Z-technology, whose development started in the early 1970's, enables the production of a focal plane array of any desired size by butting individual pixelated detector modules from all their sides. Z-technology is described in a recent review article entitled "Applications of Advanced Z-Technology Focal Plane Architectures" by J. C. Carson, published in SPIE Vol. 930, Infrared Detectors and Arrays, pp. 164-182 (1988), and variously in U.S. Pat. Nos. 4,490,626, 4,525,921, 4,551,629 and 4,555,623, all of which are hereby incorporated by reference, each in its entirety. This butting capability is achieved by integrating all the read-out electronics coupled to each of the detector pixels, on the back side of the detector and in a form of stacks of layers in the Z-direction, the detector plane being oriented in the X-Y plane. This configuration, with the electronic read-outs in the Z-direction, leaves the module sides free to be butted with their neighbors and with surrounding modules.

In this technique, each module includes an integral number of pixels, set apart from each other by the pixel pitch. To maintain this pitch over the whole of the focal plane, which is required for obtaining an accurate image, individual modules must be butted with no dead spaces between them, and at a fixed pitch between module and module. Butting of the modules with no spaces between them also assures that there will be no dead areas in the camera head, which do not contribute to image acquisition.

However, normal production techniques are such that the module dimensional tolerances, and those of the assembly components by means of which they are mounted onto the electronic base board in the camera head, may result in either unacceptable gaps between neighboring modules, or conversely, interference between the adjacent edges of the modules, such that they cannot even be fitted into the base board side-by-side. Even if all the modules could be fitted into the array, the periodicity of the pixel pitch would be degraded because of these tolerances. Production of the modules with such tight tolerances that they would all fit together "perfectly" would make the cost of such a camera head prohibitive.

There therefore exists a need for a method of constructing and arranging detector modules, which can be tiled to produce focal-plane arrays of pixelated detectors having constant pitch, such that, in spite of generally used production tolerances for these modules, they can be mounted in a continuous and regular tiled pattern on a Detector Carrier Board (DCB). Furthermore, the need exists that in such a focal-plane arrays of detector modules, the modules can be freely removed from and inserted into the DCB, while still maintaining constant pitch of the pixels over the whole focal-plane of the cameras.

The disclosures of each of the publications mentioned in this section and in other sections of the specification are hereby incorporated by reference, each in its entirety.

SUMMARY OF THE INVENTION

The present invention seeks to provide a new radiation camera head having a focal-plane array of pixelated detectors having constant pitch between pixels over the whole of the camera head, while using detector modules having normal production tolerances, and which can nevertheless be readily removed and replaced in the detector array. Furthermore, the head collimator is such that the head sensitivity is maintained at its optimum value.

There is thus provided in accordance with a preferred embodiment of the present invention, a radiation camera head incorporating an array of pixelated detector modules, each module having essentially the same pixel pitch. The pitch between modules is made to be slightly larger than the module size, by an amount exceeding the largest production tolerance expected between module and module, or between any of the modules' associated mounting hardware, such that a gap is generated between modules which enables the simple removal and insertion of modules in the array, without interference from the varying production sizes of the modules.

Furthermore, in accordance with another preferred embodiment of the present invention, in order to maintain constant pixel pitch over the whole of the array, in spite of the gaps between neighboring modules, the pixels adjacent to the side walls of each pixels are preferably of reduced size, the reduction in dimension of these pixels being "donated" to provide the space required for the inter-module gaps. However, since reduced size pixels have reduced sensitivity, and constant overall pixel sensitivity is important to avoid contrast changes over the image, insulated conductive bands are preferably applied to the module side-walls, in order to improve the performance of these side wall pixels.

In accordance with yet another preferred embodiment of the present invention, the collimator is arranged such that its septa fall on the gaps between detector pixels, and hence also on the gaps between modules. In this manner, the collimator is registered to the pixels, and does not contribute any loss of sensitivity in the array because of shadowing of active pixel areas of the detector. As a result of this novel construction, there is provided a radiation camera head with the advantages that it:

(i) maintains constant pitch between pixels, thus avoiding deformation of the acquired image;
(ii) utilizes a collimator that is properly registered relative to the pixels, thus increasing the detection sensitivity;
(iii) minimizes detection loss due to dead areas produced by the inter-module gaps; and
(iv) allows the insertion and removal of the modules respectively into and out of the camera head, while still maintaining advantages (i) to (iii) mentioned above.

There is also provided in accordance with another preferred embodiment of the present invention, a radiation detector camera head comprising an array of at least two pixelated detector modules mounted in the head, wherein each of the at least two modules has module lateral dimensions, the modules being mounted at a pitch at least equal to the largest module lateral dimension of any of the at least two modules, such that a gap generally exists between an adjacent pair of the at least two modules, and wherein the pixelated detector modules have side walls, the pixels on the modules not located adjacent to a side wall having first lateral dimensions, and those disposed along a side wall having second lateral dimensions generally smaller than the first lateral dimensions.

In the above-described radiation detector camera head, any one of the adjacent pair of modules may be removable from or insertable into the head, without interference from the other of the adjacent pair. Furthermore, the gap between the modules is designed to compensate dimensionally for the fact that the second lateral dimensions are generally smaller than the first lateral dimensions, such that an essentially constant pixel pitch is maintained across the array. The constant pitch between pixels is operative to reduce deformation of images acquired by the camera.

Additionally, in accordance with yet another preferred embodiment of the present invention, in the above-described radiation detector camera head the module lateral dimension may vary according to the production tolerance of the module and has a maximum permitted value, and the gap is preferably at least twice as large as the maximum permitted value. Furthermore, if the at least two modules are mounted in the camera head by means of mounting hardware, the mounting hardware too may vary in lateral dimension according to the mounting hardware production tolerance and may have a maximum permitted value, and the gap may be at least twice as large as the sum of the maximum expected production tolerances of the modules and the mounting hardware.

There is further provided in accordance with yet another preferred embodiment of the present invention, a radiation detector camera head comprising an array of at least two pixelated detector modules mounted in the head, wherein each of the at least two modules has module lateral dimensions, the modules being mounted at a pitch at least equal to the largest module lateral dimension of any of the at least two modules, such that a gap generally exists between an adjacent pair of the at least two modules, and wherein the pixelated detector modules have side walls, the pixels on the modules not located adjacent to a side wall having first lateral dimensions, and those disposed along a side wall having second lateral dimensions generally smaller than the first lateral dimensions, and wherein the camera head also comprises a collimator having multiple holes, the holes being arranged in a pitch generally equal to the pitch of the pixels of the modules and the holes being spaced by septa, and wherein the collimator is arranged such that the septa fall generally in the region between the detector pixels.

In the above-described camera head, the collimator and the modules are preferably arranged such that the septa also fall on the gaps between the modules. Consequently, the camera head preferably reduces detection loss due to dead areas in the array. Furthermore, any one of the adjacent pair of modules may be either removable from or insertable into the head without interference from the other of the adjacent pair. The gap between the modules preferably compensates dimensionally for the second lateral dimensions being generally smaller than the first lateral dimensions, such that an essentially constant pixel pitch is maintained across the array. In the above-described radiation detector camera head the constant pitch between pixels is preferably operative to reduce deformation of images acquired by the camera.

In accordance with still another preferred embodiment of the present invention, in the above-described radiation detector camera head, the module lateral dimensions generally vary according to the production tolerance of the module and have a maximum permitted value, and the gap is preferably at least twice as large as the maximum permitted value. The at least two modules may be mounted in the camera head by means of mounting hardware, and the mounting hardware may also vary in lateral dimension according to the mounting hardware production tolerance and may have a maximum permitted value, and the gap is preferably at least twice as large as the sum of the maximum expected production tolerances of the modules and the mounting hardware.

There is further provided in accordance with still another preferred embodiment of the present invention, a radiation detector camera head comprising an array of at least two pixelated detector modules mounted in the head, and wherein each of the at least two modules has module lateral dimensions, the modules being mounted at a pitch at least equal to the largest module lateral dimension of any of the at least two modules, such that a gap generally exists between an adjacent pair of the at least two modules, and wherein the pixelated detector modules have side walls, the pixels on the modules not located adjacent to a side wall having first lateral dimensions, and those disposed along a side wall having second lateral dimensions generally smaller than the first lateral dimensions, and wherein the camera head also comprises an insulated conductive band applied to at least one of the side walls of at least one of the modules, such as to compensate for reduced sensitivity arising from the smaller lateral dimensions of the pixels disposed along the at least one side wall.

In the above-described radiation detector camera head, the gap is preferably sufficiently large also to accommodate the insulated conductive band. Any one of the adjacent pair of modules may be either removable from or insertable into the head, without interference from the other of the adjacent pair. Furthermore, the gap between the modules compensates dimensionally for the second lateral dimensions being generally smaller than the first lateral dimensions, such that an essentially constant pixel pitch is maintained across the array. This constant pitch between pixels is preferably operative to reduce deformation of images acquired by the camera.

In accordance with a further preferred embodiment of the present invention, in the above-described radiation detector camera head, the module lateral dimensions may vary according to the production tolerance of the module and have a maximum permitted value, and the gap is preferably at least twice as large as the maximum permitted value. Additionally, the at least two modules are preferably mounted in the camera head by means of mounting hardware, the mounting hardware also varying in lateral dimension according to the mounting hardware production tolerance and having a maximum permitted value, and wherein the gap is at least twice as large as the sum of the maximum expected production tolerances of the modules and the mounting hardware.

There is also provided in accordance with yet a further preferred embodiment of the present invention, a radiation detector camera head as described above, and also comprising a collimator having multiple holes, the holes being arranged in a pitch generally equal to the pitch of the pixels of the modules and being spaced by septa, and the collimator being arranged such that the septa fall generally in the region between the detector pixels. In this camera head, the collimator and the modules are preferably arranged such that the septa also fall on the gaps between the modules. Such a camera head preferably reduces detection loss due to dead areas in the array.

BRIEF DESCRIPTION OF THE DRAWINGS

The present invention will be understood and appreciated more fully from the following detailed description, taken in conjunction with the drawings in which.

DETAILED DESCRIPTION OF THE PREFERRED EMBODIMENTS

Figure 1:
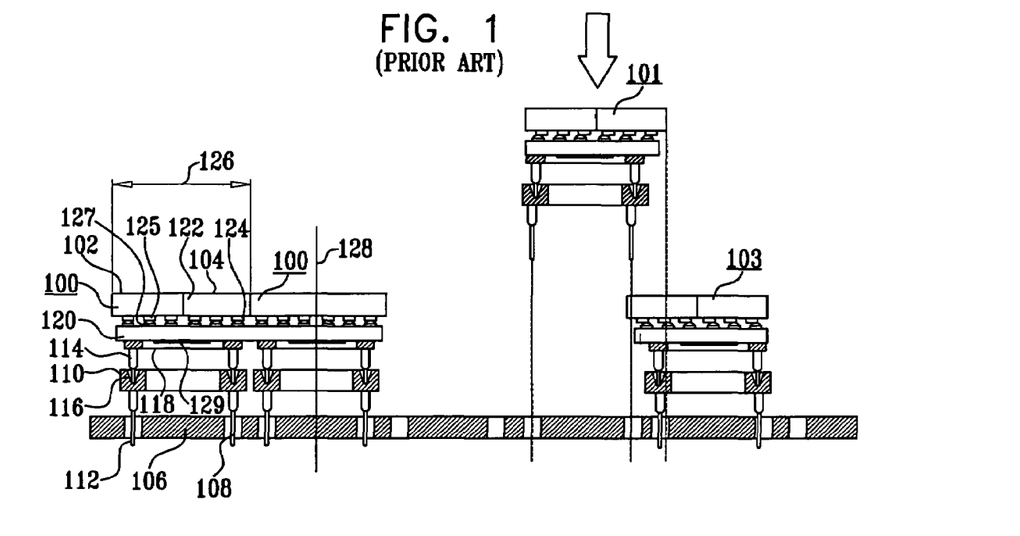
FIG. 1 is a schematic cross-sectional view from the side of a prior-art detector array, constructed according to conventional Z-technology.

Reference is now made to FIG. 1 which is a schematic cross-sectional illustration from the side of a prior-art detector array constructed according to conventional Z-technology. According to this technology, individual detector modules 100 are tiled by a butting process, to form a focal plane array 102 of cathodes 104. The tiling of modules 100 is preferably achieved by mounting the modules on a Detector Carrier Board (DCB) 106. The DCB 106 is generally made of Printed Circuit Board (PCB) and may include mounting holes 108 either for direct mounting of the modules 100, or alternatively for receiving the pins 112 of mounting sockets 110. Modules 100 are preferably mounted on sockets 110 by inserting their Pin Grid Array (PGA) 114 into mounting holes 116 of sockets 110. PGA 114 is arranged along a further PGA frame 118. PGA frame 118 is attached to carrying plate 120, to which a detector or detectors 122 are bonded by conductive glue 124. The conductive glue 124 electrically and mechanically couples pixels 125 of detectors 122 with contact pads 127 of plate 120. Carrying plate 120 also carries an Application Specific Integrated Circuit (ASIC) 129 whose inputs are electrically connected to each of pixels 125 for processing the signal produced by these pixels. The outputs of ASIC 129 are electrically connected to PGA 114 to transmit the signals, processed by the ASIC to the read-out system through the Detector Carrier Board 106. The size of each detector plane 126 is generally larger than or equal in size to the carrying plate 120 and carrying plate 120 is generally larger than or equal in size to the PGA frame 118. PGA 114 is used for mounting modules 100 on the DCB by inserting the pins of the PGA 114 directly into holes 108 in the DCB 106 or into holes 116 of sockets 110 attached to the DCB 106.

The holes 108 in the DCB 106 are arranged in a form of groups of holes under sockets 110. Groups of holes 108 have the same spatial arrangement as the pins 112 of sockets 110 and thus have the same pitch as the pitch of pins 112. The pitch space between the groups of holes 108 is equal to the lateral length 126 of modules 100. The cathode plane of detectors 122, carrying plate 120, PGA frame with its pins 114, socket 110 with its pins 112, and the groups of holes of PGA 118, should all be centered around the symmetry axis of modules 100. Such a symmetry axis 128 is shown for clarity, only on the second module 100 from the left of the drawing. To produce buttability with no dead area between modules 100, the production accuracy of these modules would thus need to be extremely high.

On the right hand side of FIG. 1 are shown two more modules 101 and 103, having the same components as modules 100, but showing the effects of production tolerances on the modules. Module 101 illustrates an extreme situation when all the production tolerances in the group of detectors 122, carrying plate 120, PGA frame with its pins 114, socket 110 with its pins 112, and PGA holes 118 are such as to be accumulative in one direction, shown as the direction to the right in FIG. 1. On the other hand module 103 illustrates another extreme situation when all the above tolerances are accumulated in the opposite direction, to the left. It can be seen that in this situation, it is impossible to insert module 101 in DCB 106, or even into its socket without interfering with its neighboring module 103. It is thus clear that butting of modules with no dead space between them, according to the prior art construction methods, requires very tight production tolerances that are economically unrealistic to achieve.

Figure 2:
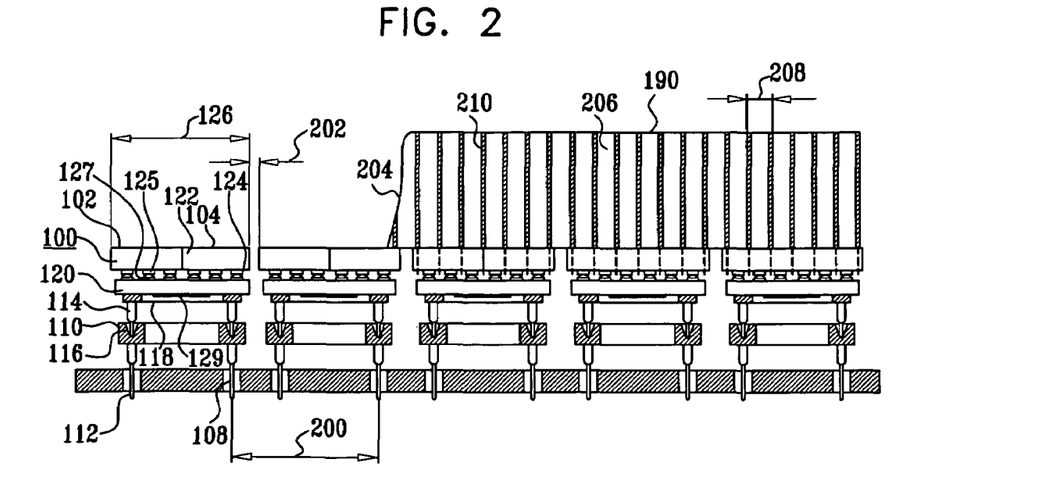
FIG. 2 is a schematic cross-sectional view from the side of a camera head incorporating a detector array, constructed and operative according to a preferred embodiment of the present invention, in which the module pitch is made slightly larger than the module size, and the collimator is arranged such that its septa fall on gaps between detector pixels.

Reference is now made to FIG. 2, which is a schematic cross-sectional view from the side, of a camera head 190 incorporating a detector array, constructed and operative according to a preferred embodiment of the present invention. According to this construction, the assembly of modules 100 are mounted into sockets 110 on the DCB 106 in a manner that enables correct insertion even when the modules, or any of their associated mounting components, are produced with normal production tolerances. According to this preferred configuration, pitch 200 between the groups of holes 108 should be greater than module size 126. For the tightest tolerances that can be economically achieved today, pitch 200 should be larger than module dimension 126 by at least 250-300 microns. Such an enlarged pitch 200 is also essentially to allow for simple replacement of any module 100, when such replacement is needed. The implication of this 250-300 micron reserve is that for two neighboring modules 100 which have dimensions exactly as designed and hence zero tolerances, the gap 202 between those modules is 250-300 microns. For another group of modules with the maximum allowed tolerances, a situation may arise in which one of the modules will almost touch its neighbor on one side and will produce a gap of 500-600 microns on the other side.

Each of modules 100 contains integral number of pixels 125. In this configuration, when modules 100 are tiled with spaces 202 between them, the constant pitch of pixels 125 is not maintained over the focal plane array 102 over the whole camera head.

A collimator 204 having septa 210 and holes 206 is preferably disposed in front of the focal plane array 102. The holes and septa are arranged to have a pitch 208 equal to the pitch between the pixels 125 within each module 100. The holes are arranged to transmit the incident radiation to the surface of detectors 122 in modules 100. The ideal alignment of collimator 204 is achieved when the projections of its septa coincide with a grid of lines passing between pixels 125. When the collimator 204 has a pitch 206 having an ideal alignment with respect to the pixels 125 of all of the modules 100, the collimator is known as a registered collimator. The ability to align collimator 204 in a registered position is very important for two reasons:

(i) Events produced by absorbing photons in the vicinity of the symmetry lines between pixels 125 suffer from the charge sharing effect, as described in the article by A. E. Bolotnikov et al., entitled "Charge loss between contacts of CdZnTe pixel detectors", published in Nuclear Instruments and Methods in Physics Research A, Vol. 432, pp. 326-331 (1999). The sphere of the charge carriers produced by the absorbed photon is split into two groups of charge carriers. Each of these groups drifts toward different adjacent pixels 125 under the influence of the symmetric electrical field in the mid-region between the pixels. Events occurring in the mid region between pixels are not therefore suitable for measuring the photon energy, since the energy of the absorbed photon is divided and measured by two different pixels 125.

(ii) Furthermore, if there exists surface conductivity between adjacent pixels 125, the mid-region between these pixels suffers most from surface recombination and charge loss, as described by Bolotnikov, op. cit. This charge loss is also a contributing factor to the inability to measure the energy of photons absorbed in the between-pixel regions. For both of the above reasons, this region is essentially useless for imaging by single photon counting.

The septa 210 of collimator 204 screen the radiation impinging on the camera head and prevent the incidence of photons on the regions of the detectors that are under these septa, which cannot therefore be used for image processing. In order to reduce loss of true events, and in order to increase the camera sensitivity, there should be essential spatial coincidence between these ineffective areas, i.e. between the areas in the vicinity of the mid lines between the pixels 125, and the areas immediately beneath the septa 210 of the collimator 204. This overlap defines the registration of the collimator.

It is therefore evident that maintaining constant pitch between pixels over the whole of the focal plane is very important for two reasons:

(i) For producing an image without deformations, and
(ii) For ensuring that the collimator is registered over the whole of the focal plane, to provide high detector efficiency.

As explained hereinabove, in camera head 190, the gaps 202 allow the desired insertion and replacement of modules 100 with normal production tolerances into the DCB 106, or into sockets 110. However, these gaps at the same time have the disadvantage that they prevent the maintenance of the desired constant pixel pitch over the whole active area of the camera, and thus result in deformed images with reduced sensitivity. The dead areas produced by the gaps 202 between adjacent modules further reduce the sensitivity of the head 190.

Figure 3:
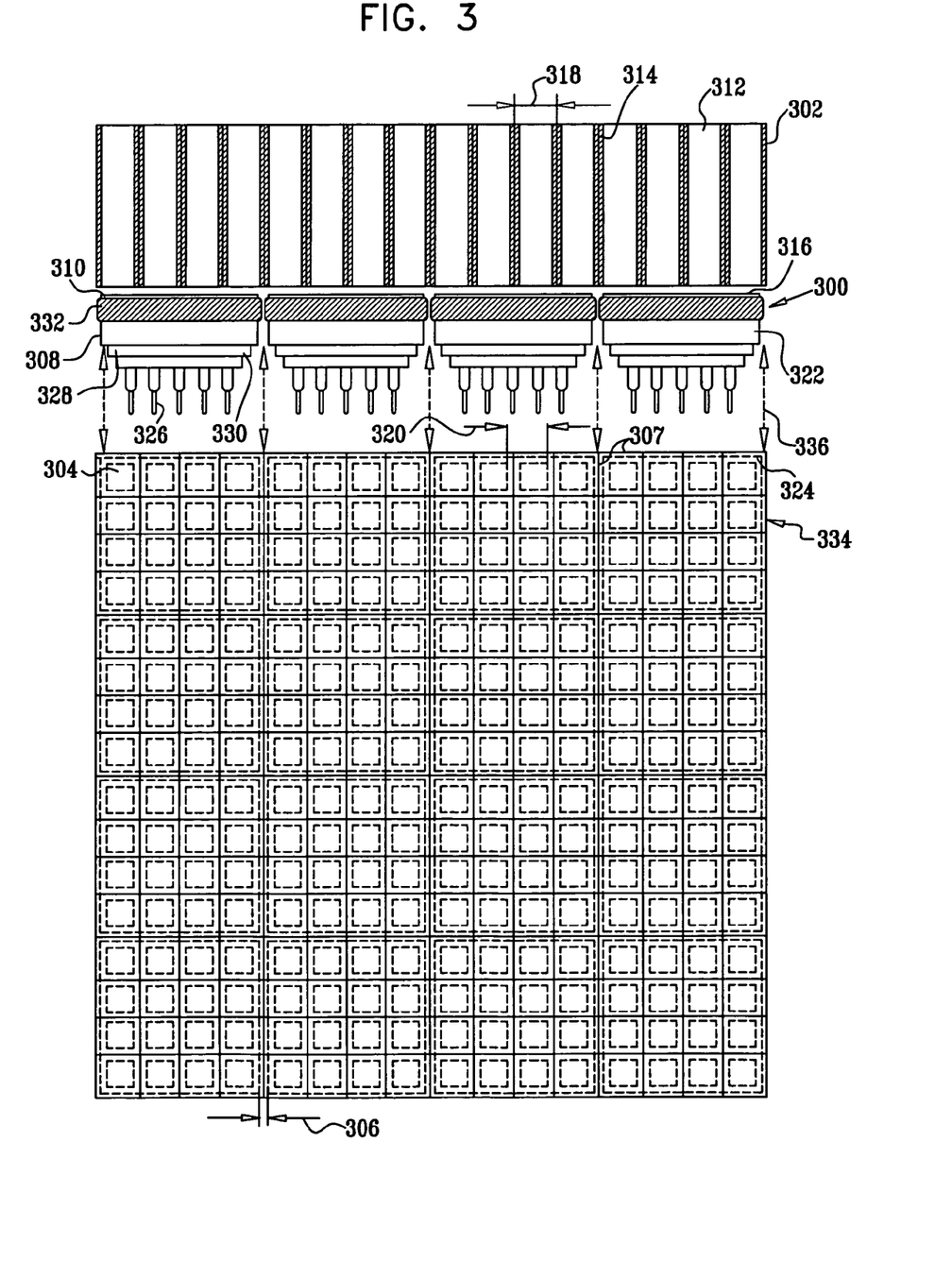
FIG. 3 is a composite schematic illustration from a side view and a top view, of the camera head shown in FIG. 2, but incorporating a further preferred embodiment for improving according to the present invention, wherein the side-wall and corner pixels of the detector are reduced in size to enable the maintenance of a constant pixel pitch in spite of the inter-module gaps, and also including a conductive band around each module to maintain the sensitivity of the reduced size pixels.

Reference is now made to FIG. 3, which is a composite schematic illustration of a camera head similar to that shown in FIG. 2, but incorporating a further preferred embodiment according to the present invention, which results in a solution for the above-mentioned disadvantage of the preferred embodiment shown in FIG. 2. FIG. 3 shows the detector from two views. The upper part is a cross-sectional view from the side of a camera head 300 with collimator 302. The lower part is a plan view of the same head 300, but with the collimator 302 removed to show the pixelated detector array pattern. The relative positions between the views in the upper and lower parts of the drawing are correlated by means of the dashed arrows 336.

Collimator 302, having holes 312 and septa 314, is placed above the cathodes 316 of modules 308 that form the focal plane array of the camera. The collimator is such that the holes have a pitch 318 equal to pitch 320 of the pixels 304 on the detectors 322 in each of the modules 308. In the plan view in the lower part of FIG. 3, the pixels 304 and edges 324 of detectors 322 are illustrated by broken lines to indicate that they are situated below the visible upper surface of the detectors. The pitch of the collimator holes and that of the pixels are preferably equal and constant over the whole of the camera-head 300. Furthermore, this equality of pitch is preferably maintained between modules 308. The maintenance of constant pixel pitch even between modules, where there is a gap 306, can only be achieved by reducing the dimensions of those of the pixels situated along side-walls 307 of the modules. While the dimensions of the "inland" pixels can be expressed as 320×320, where 320 is the pixel pitch, the dimensions of the side-wall pixels are given by 320×(320−306/2), where 306 is the gap dimension. Similarly, the dimensions of the corner pixels are given by (320−306/2)×(320−306/2). According to this preferred embodiment of the present invention, it is the use of different sizes for the inland, the side-wall, and the corner pixels that enables the maintenance of constant pitch between modules and over the whole of the head, while still maintaining gaps between modules to enable easy replacement and fitting of the modules, and constant pitch, as described above in relation to FIG. 2.

However, side-wall and corner pixels suffer from reduced performance due to surface effects. In addition, these pixels no longer have the square symmetry of the inland pixels. For the above reasons the performance of the side-wall and corner pixels is poor. It is possible to improve the performance of these pixels, and to even bring their performance back to the level of the inland pixels by applying insulated conductive bands 332 to side walls 307, as described in U.S. Pat. No. 6,034,373, hereby incorporated by reference in its entirety, for "Semiconductor Radiation Detector with Reduced Surface Effects", to some of the inventors in the present application. The use of the side-wall conductive bands 332 is an important feature for ensuring the performance of the camera according to the present invention.

However, the conductive bands 332 are not an integral part of the detector material, but are additional components applied to the outer walls of the modules 308, increasing their dimension. Consequently, the gaps 306 must be made large enough not only to allow the insertion of the modules 308 into the Detector Carrier Board 106 and their withdrawal therefrom, but they must also allow enough space to accommodate the conductive bands 332.

In the embodiment of FIG. 3, the modules 308 are shown also to include components equivalent to those described in the modules 100 shown in FIG. 2, including the PGA 326, the PGA frame 328, and the carrier plate 330. The only essential way by which modules 308 differ from modules 100 of the embodiment shown in FIG. 2 is by the additional insulated conductive bands 332, and in the way that the side-wall and corner pixels of the detector differ from the inland pixels.

The solid lines 334 in the plan view indicate the mid lines along which the septa 314 of collimator 302 are projected. In this configuration, the collimator is registered with respect to the pixels 304, such that the unusable mid-line areas between pixels are those areas essentially screened by the septa, and optimum camera sensitivity is thus achieved thereby. In addition, the dead areas between separate modules 304, comprised of the spaces themselves 306 and the conductive bands 332 surrounding the modules, are covered by the septa, such that these dead areas also do not cover any of the sensitive areas of the detector.

The advantages of the camera head 300, according to the various above-described preferred embodiments of the present invention, can thus be summarized in that:

(i) the camera head maintains constant pitch between pixels, thus avoiding deformation of the acquired image;
(ii) the camera head utilizes a collimator that is properly registered relative to the pixels, thus increasing the detection sensitivity;
(iii) the camera head minimizes detection loss due to dead areas produced by the inter-module gaps; and
(iv) the camera head allows the insertion and removal of the modules respectively into and out of the DCB or its sockets (not shown), while still maintaining the advantages mentioned in paragraphs (i) to (iii) above.

Figure 4:
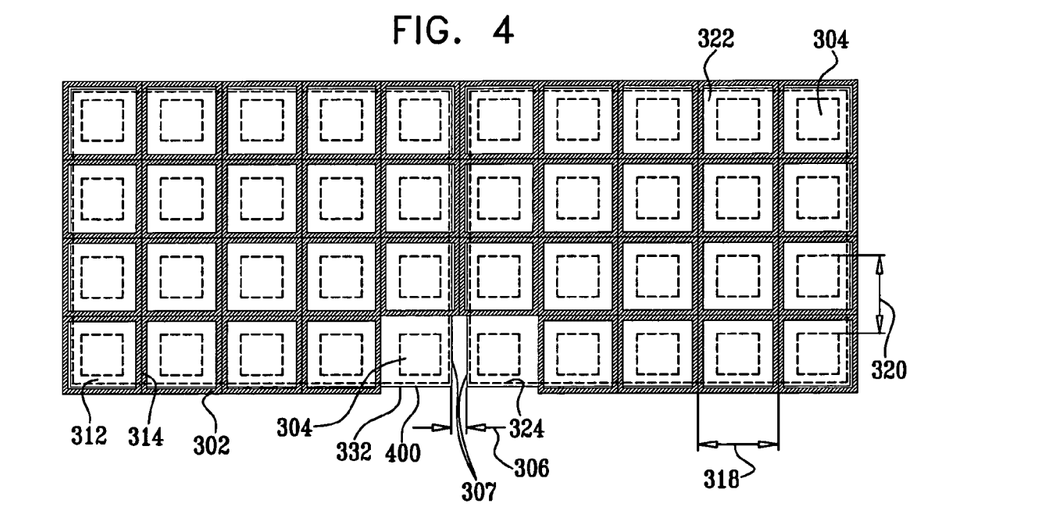
FIG. 4 is a schematic drawing in enlargement of two modules taken from the plan view of the camera head of FIG. 3, with the collimator in place.

Reference is now made to FIG. 4, which is a schematic drawing in enlargement of two modules 304 taken from the plan view of head 300 of FIG. 3, but shown with the collimator 302 in place. Two apertures 312 of the collimator have been schematically removed to show the exposed top surface of detectors 322. The component parts of the array are labeled identically to those shown in FIG. 3. In addition, the insulating layer 400 is shown at the module side-walls, on top of which the conductive bands 332 are deposited.

Although the methods and devices described herein mainly address the construction of X-ray and gamma ray detection and imaging cameras, the principles of the present invention can also be used in the construction of other systems comprising detector arrays, such as solid state cameras based on charge-coupled device (CCD) arrays and CMOS detector arrays.

It will thus be appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. A single photon counting radiation detector camera head for gamma ray imaging comprising an array of multiple removable pixelated detector modules mounted in said head for producing an imaging focal plane having pixels to produce a signal, said modules including a pixelated detector, selected from a group including semiconductors made of CdZnTe and CdTe, and an ASIC having inputs, said inputs being electrically connected to each of said pixels for processing the signal produced by said pixels, said modules comprising said pixels and having side walls, said modules being mounted such that a gap exists between said side walls of an adjacent pair of said modules, said pixels on said modules not located adjacent to a side wall have first lateral dimensions, and at least some of said pixels disposed along said side walls have second lateral dimensions, wherein said second lateral dimension is smaller than said first lateral dimension by an amount that is equal to half of the width of said gap, wherein the mid-line areas between said pixels of said modules suffer from charge sharing effect, wherein said mid-line areas and said gap between said modules are essentially useless areas for imaging by single photon counting, wherein said camera head also comprises a single collimator unit in front of said imaging plane and over multiple said modules in said imaging focal plane, said collimator having multiple holes that are arranged in a constant pitch across said imaging focal plane that is equal to said first lateral dimension and said holes being spaced by septa, said septa being arranged along mutually perpendicular axes, and wherein said single collimator unit is registered over said pixels of multiple said modules in said imaging focal plane such that said septa of said collimator are substantially aligned with said useless areas for overlapping the shadowing of said septa with said useless areas to obtain optimum camera sensitivity for said imaging by single photon counting.

2. A radiation detector camera head according to claim 1, and wherein any one of said adjacent pair of modules is at least one of removable from or insertable into said head, without interference from the other of said adjacent pair.

3. A radiation detector camera head according to claim 1, and wherein said gap between said modules compensates dimensionally for said second lateral dimensions being smaller than said first lateral dimensions, such that an essentially constant pitch is maintained between said pixels across said array.

4. A radiation detector camera head according to claim 3, and wherein said constant pitch between said pixels is operative to reduce deformation of images acquired by said camera.

5. A radiation detector camera head according to claim 1, and wherein said module has a lateral dimension which varies according to a first production tolerance of said module and has a first maximum permitted value, and wherein said gap is at least twice as large as said first maximum permitted value.

6. A radiation detector camera head according to claim 5, and wherein said at least two modules are mounted in said camera head by means of mounting hardware, said mounting hardware also varying in lateral dimension according to a second production tolerance and having a second maximum permitted value, and wherein said gap is at least twice as large as a sum of said first and second maximum permitted values.

7. A radiation detector camera head according to claim 1 and wherein each of said modules has module lateral dimensions, said modules being mounted at a pitch at least equal to the largest module lateral dimension of any of said modules.

8. A radiation detector camera head according to claim 7, and wherein said collimator and said modules are arranged such that said septa also fall on said gaps between said modules.

9. A radiation detector camera head according to claim 7, and wherein said camera head reduces detection loss due to dead areas in said array.

10. A radiation detector camera head according to claim 7, and wherein any one of said adjacent pair of modules is at least one of, removable from or insertable into said head, without interference from the other of said adjacent pair.

11. A radiation detector camera head according to claim 7, and wherein said gap between said modules compensates dimensionally for said second lateral dimensions being generally smaller than said first lateral dimensions, such that an essentially constant pitch is maintained between said pixels across said array.

12. A radiation detector camera head according to claim 11, and wherein said constant pitch between said pixels is operative to reduce deformation of images acquired by said camera.

13. A radiation detector camera head according to claim 7, and wherein said module lateral dimensions vary according to a first production tolerance of said modules and have a first maximum permitted value, and wherein said gap is at least twice as large as said first maximum permitted value.

14. A radiation detector camera head according to claim 13, and wherein said at least two modules are mounted in said camera head by means of mounting hardware, said mounting hardware also varying in lateral dimensions according to a second production tolerance and having a second maximum permitted value, and wherein said gap is at least twice as large as a sum of said first and second maximum permitted values.

15. A radiation detector camera head according to claim 1 wherein said camera head also comprises an insulated conductive band applied to at least one of said side walls of said modules, such as to compensate for reduced sensitivity arising from said smaller lateral dimensions of said pixels disposed along said at least one side wall.

16. A radiation detector camera head according to claim 15, and wherein said gap is sufficiently large also to accommodate said insulated conductive band.

17. A radiation detector camera head according to claim 15, and wherein any one of said modules is at least one of removable from or insertable into said head, without interference from an adjacent module.

18. A radiation detector camera head according to claim 15, and wherein said gap between said modules compensates dimensionally for said second lateral dimensions being smaller than said first lateral dimensions, such that an essentially constant pitch is maintained between said pixels across said array.

19. A radiation detector camera head according to claim 18, and wherein said constant pitch between said pixels is operative to reduce deformation of images acquired by said camera.

20. A radiation detector camera head according to claim 15, and wherein said module has lateral dimensions which vary according to a first production tolerance of said modules and has a first maximum permitted value, and wherein said gap is at least twice as large as said first maximum permitted value.

21. A radiation detector camera head according to claim 20, and wherein said modules are mounted in said camera head by means of mounting hardware, said mounting hardware also varying in lateral dimension according to a second production tolerance and having a second maximum permitted value, and wherein said gap is at least twice as large as a sum of said first and second maximum permitted values.

22. A radiation detector camera head according to claim 15, wherein said holes of said collimator are arranged in a pitch equal to the pitch of said pixels of said modules and are spaced by septa, and said collimator is arranged such that said septa fall in a region between said detector pixels.

23. A radiation detector camera head according to claim 22, and wherein said collimator and said modules are arranged such that said septa also fall on said gaps between said modules.

24. A radiation detector camera head according to claims 22, and wherein said camera head reduces detection loss due to dead areas in said array.

25. A method for producing a single photon counting radiation detector camera head for nuclear imaging, comprising:
    providing multiple removable pixelated detector modules and mounting said modules in said head for producing imaging focal plain, said modules including at least one tile of semiconductor pixilated detector selected from a group including semiconductors made of CdTe and CdZnTe, said at least one tile including multiple pixels, said modules having side walls and comprising pixels,
    mounting said modules such that a gap exists between said side walls of an adjacent pair of said modules, wherein said pixels on said modules not located adjacent to said side walls have first lateral dimensions, and at least some of said pixels disposed along said side walls have second lateral dimensions, wherein said second lateral dimension is smaller than said first lateral dimensions by an amount that is equal to half of the width of said gap, wherein the active area of said pixels along said sidewalls ends at said sidewalls, wherein the mid-line areas between said pixels of said modules suffer from charge sharing effect, and wherein said mid-line areas and said gap between said modules are essentially useless areas for imaging by single photon counting;
    providing a single collimator unit in front of said imaging plain and over multiple said modules in said focal plain, said collimator having multiple holes that are arranged in a constant pitch across said imaging focal plain that is equal to said first lateral dimension and said holes being spaced by septa, said septa extending along mutually perpendicular axes; and
    registering said single collimator plate over said imaging focal plane such that said septa of said collimator are substantially aligned with said useless areas for overlapping the shadowing of said septa with said useless areas to obtain optimum camera sensitivity for said imaging by single photon counting.

26. A method for producing a radiation detector camera head according to claim 25 and wherein said septa fall in a region between said detector pixels.

27. A method for producing a radiation detector camera head according to claim 25 and also comprising applying an insulated conductive band to at least one of said side walls of at least one of said modules, so as to compensate for a reduced sensitivity arising from said smaller lateral dimensions of said pixels disposed along said at least one side wall.

* * * * *